United States Patent [19]

Lipton et al.

[11] Patent Number: 4,884,876
[45] Date of Patent: Dec. 5, 1989

[54] ACHROMATIC LIQUID CRYSTAL SHUTTER FOR STEREOSCOPIC AND OTHER APPLICATIONS

[75] Inventors: Lenny Lipton, Greenbrae; Arthur Berman, San Jose; Lawrence D. Meyer, Mill Valley, all of Calif.

[73] Assignee: Stereographics Corporation, San Rafael, Calif.

[21] Appl. No.: 267,699

[22] Filed: Nov. 2, 1988

Related U.S. Application Data

[63] Continuation of Ser. No. 116,242, Oct. 30, 1983, abandoned.

[51] Int. Cl.$^4$ .............................................. G02F 1/13
[52] U.S. Cl. ........................... 350/347 E; 350/331 R; 350/332; 350/337
[58] Field of Search ........... 350/347 R, 347 E, 331 R, 350/332, 337; 358/88, 92

[56] References Cited

U.S. PATENT DOCUMENTS

| | | | |
|---|---|---|---|
| 3,694,053 | 9/1972 | Kahn | 350/347 E |
| 3,876,287 | 5/1975 | Sprokel | 350/347 E |
| 4,021,846 | 5/1977 | Reese | 358/92 |
| 4,228,574 | 10/1980 | Culley et al. | 29/25.13 |
| 4,239,349 | 12/1980 | Scheffer | 350/337 X |
| 4,385,806 | 5/1983 | Fergason | 350/347 R |
| 4,435,376 | 3/1984 | Fergason | 350/332 |
| 4,444,469 | 4/1984 | Kaye | 350/347 E |
| 4,522,468 | 6/1985 | Goscianski et al. | 350/347 E X |
| 4,523,226 | 6/1985 | Lipton et al. | 358/88 |
| 4,562,463 | 12/1985 | Lipton | 358/88 |
| 4,582,396 | 4/1986 | Bos et al. | 350/347 E |
| 4,583,825 | 4/1986 | Buzak | 350/335 |
| 4,674,841 | 6/1987 | Buzak | 350/347 E X |
| 4,693,562 | 9/1987 | Hasegawa et al. | 350/337 |
| 4,701,028 | 10/1987 | Clerc et al. | 350/347 E X |
| 4,719,507 | 1/1988 | Bos | 358/92 |
| 4,726,663 | 2/1988 | Buzak | 350/337 X |
| 4,767,190 | 8/1988 | Dir et al. | 350/339 R |
| 4,781,440 | 11/1988 | Toda | 350/347 |

FOREIGN PATENT DOCUMENTS

| | | |
|---|---|---|
| 3607629A1 | 10/1986 | Fed. Rep. of Germany . |
| 61-250613 | 11/1986 | Japan . |
| GB2175171A | 11/1986 | United Kingdom . |

OTHER PUBLICATIONS

Hartmann et al., "Three-Dimensional TV with Cordless FLC Spectacles," Information Display, Oct. 1987, pp. 15-17.

Title; et al., "Achromatic Retardation Plates," SPIE, vol. 307, Polarizers and Applications (1981), pp. 120-125.

Fergason, J. L. "Use of Strong Surface Alignment in Nematic Liquid Crystals For High Speed Light Modulation", "SPIE, vol. 684 (1986), pp. 81-86".

T. Haven. "A Liquid-Crystal Video Stereoscope . . . ,"SPIE, vol. 761, True 3D Imaging Techniques and Display Technologies (1987), pp. 23-26.

*Handbook of Optics*, edited by W. G. Driscoll (McGraw-Hill Book Company, 1978), pp. 10-127 and 10-128.

S. Pancharatnam, Parts I and II of "Achromatic Combinations of Birefringent Plates", The Proceedings of the Indian Academy of Sciences, vol. XLI, No. 4, Sec. A (1955), pp. 130-144.

1980 Biennial display Research Conference, Performance of a Matrix Display Using Surface Mode, Oct. 1980, James L. Fergason, pp. 177-179.

*Primary Examiner*—Stanley D. Miller
*Assistant Examiner*—Richard F. Gallivan
*Attorney, Agent, or Firm*—Limbach, Limbach & Sutton

[57] ABSTRACT

An achromatic liquid-crystal shutter with high dynamic range, good transmission, and high speed. The inventive shutter reduces the phenomenon of "ghosting" (image doubling) that typically occurs in conventional plano-stereoscopic CRT displays due to the low dynamic range of surface mode liquid crystal electro-optical shutters included within such displays. The inventive shutter reduces crosstalk, thus allowing comfortable fusion to take place. In one preferred embodiment, the inventive shutter system is driven by a carrier-less voltage signal having time-averaged voltage substantially equal to zero, so that a simple, low power driving circuit suffices to drive the shutter. A pair of the inventive achromatic shutters may be employed in a wireless mode as a selection device for a field-sequential stereoscopic electronic display system.

33 Claims, 4 Drawing Sheets

ACHROMATIC LIQUID CRYSTAL SHUTTER FOR STEREOSCOPIC AND OTHER APPLICATIONS

This is a continuation of co-pending application Ser. No. 116,242 filed on Oct. 30, 1987, abandoned.

FIELD OF THE INVENTION

The invention is an achromatic electro-optical shutter system that includes one or more liquid crystal cells. More particularly, the inventive electro-optic shutter system includes one or more surface mode liquid crystal cells, one or more polarizers, and one or more retardation plates, with the alignment axis of each cell, an absorption axis of each polarizer and a slow axis of each analyzer having relative orientation selected so that the system's dynamic range is optimal.

BACKGROUND OF THE INVENTION

A plano-stereoscopic display is one which produces the depth sense, stereopsis, by presenting appropriate left and right planar images to each respective eye. For the observer to be able to fuse these two planar images into a single stereoscopic view, the image for one eye must be isolated from the other. If the left eye, for example, also sees all or a portion of the intensity of the right image, there will be a perceived doubling of the image or "ghosting." Incomplete left and right channel isolation, or crosstalk, is of great concern to the designer of a stereoscopic system.

In a plano-stereoscopic field-sequential display, two factors may contribute to crosstalk: (1) phosphor decay, or afterglow, and (2) dynamic range of the shutters. The choice of cathode ray tube (CRT) phosphors in video systems is based on various display needs. In field-sequential stereoscopic technologies, use of short-persistence phosphors is preferred. Fortunately, many video and computer graphics monitors use display tubes with medium short phosphors which have a decay time which is brief enough to produce acceptably low levels of ghosting. If the phosphors' afterglow persists into the adjacent field to a significant extent, there will be crosstalk and observed ghosting because the right eye, for example, will see a reduced-intensity image of the unwanted left field.

Shutter performance is also of great concern, and two important parameters of shutter performance are the transmission of the device in its open state and its dynamic range. Dynamic range is defined as the ratio of the transmission of the shutter in its opened state to the transmission of the shutter in its closed state. It should be appreciated that the contribution to crosstalk made by the incomplete occlusion of the shutter manifests itself to the eye while the shutter is closed, while the contribution of crosstalk produced by phosphor afterglow is made during the open portion of the shutter's cycle.

Figure 1:
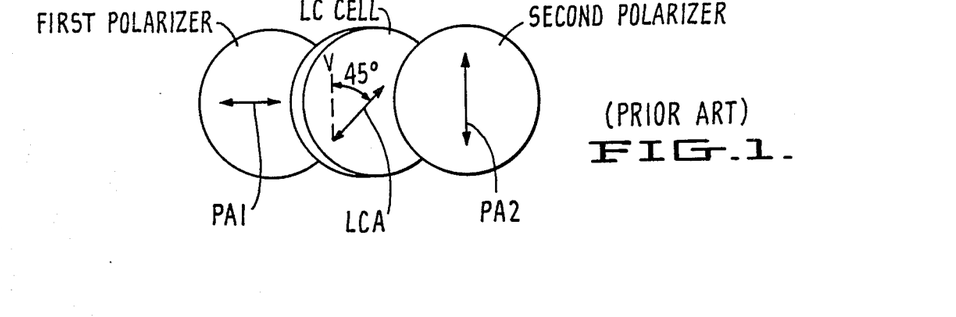
FIG. 1 is a schematic drawing of a prior art liquid crystal shutter.

In order to understand the invention it is helpful initially to review conventional shutter design, such as that of FIG. 1. The FIG. 1 shutter includes first linear polarizer PA1, surface mode liquid crystal cell LC, and second linear polarizer PA2. The absorption axis of first polarizer PA1 is parallel with the horizontal, and the absorption axis of second polarizer PA2 is parallel to the vertical. The axes of the first and second linear polarizers are bisected by the alignment axis LCA of liquid crystal cell LC. The liquid crystal cell's axis is at 45 degrees to the vertical. The liquid crystal device shown in FIG. 1 is the type called a surface mode cell whose construction is taught by Fergason in U.S. Pat. No. 4,385,806, issued May 31, 1983.

Liquid crystal cell LC is made up of a layer of liquid crystal material sandwiched between two flat and parallel glass sheets, coated with substrates on their inside facing surfaces. These substrates are thin, transparent, electrically conductive layers such as indium tin oxide. It is through this layer that the electric field is applied to the liquid crystal. Another thin coating called an alignment layer is deposited on top of the conductive layer. It is the function of this alignment layer to impose a preferred orientation on the liquid crystal molecules. Such an orientation is necessary for the shutter to exhibit the desired electro-optic effect. One way in which this orientation effect can be accomplished is to rub the alignment layer with a special material. The rubbing direction on one substrate is parallel (or anti-parallel) to the rubbing direction on the other substrate, as taught by Fergason in U.S. Pat. No. 4,385,806.

The surface mode cell described above is a capacitor and can be charged to a high or low electric potential. A surface mode cell attains its speed because only a thin layer of liquid crystal molecules near the substrate actually moves as the electric potential is switched.

In the arrangement described above, the liquid crystal material is in a retardation state when at a low electrical potential, and is in an isotropic state when at a high electrical potential. In the low potential state, the molecules near the surface maintain the alignment imposed on them by rubbing of the director alignment layer, and when in the high potential state, the molecules become aligned parallel to the electric field and are therefore isotropic rather than anisotropic. A typical high potential state is between 25 to 50 volts peak to peak, and a typical low potential state is between 0 to 10 volts. By using different voltage settings for the low potential, one can tune the retardation of the liquid crystal cell. Generally speaking, the high voltage state determines how quickly and completely the cell will "turn on," and the low potential state determines the value of retardation. By adjusting the voltages it is possible to vary the dynamic range of the shutter continuously.

The prior art cell described above will produce a dynamic range of approximately 15:1, even with a very high extinction polarizer, such as an HN22 linear polarizer manufactured by Polaroid. That is, the ratio of the intensity of light transmitted to the light occluded will be 15:1. For many applications, especially for use in a stereoscopic shutter, this is an inadequate dynamic range. In point of fact, a stereoscopic shutter requires a dynamic range of many times this ratio.

Figure 2:
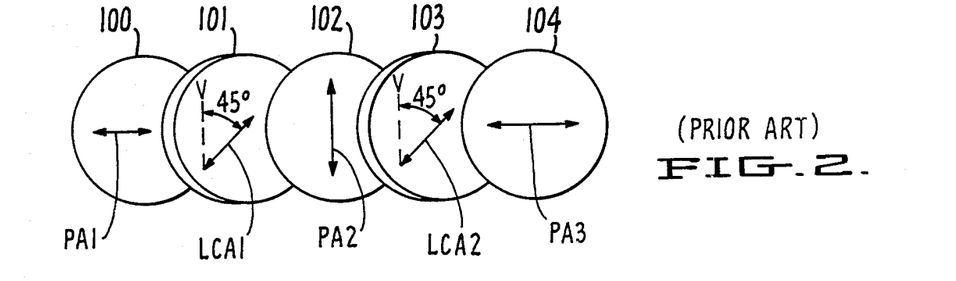
FIG. 2 is a schematic drawing of another prior art liquid crystal series shutter.

One way to improve performance that has been attempted is to place two conventional shutters in optical series as shown in FIG. 2. In FIG. 2 we see two liquid crystal shutters in optical series, shutter I (comprising first linear polarizer 100, LC cell 101, and second linear polarizer 102) and shutter II (comprising second polarizer 102, LC cell 103, and third linear polarizer 104) sharing second polarizer 102. The absorption axes PA2 and PA3 of polarizers 100 and 104 are parallel and both are orthogonal to the absorption axis PA2 of polarizer 102. Liquid crystal cells 101 and 103 have their rub axes parallel and at 45 degrees to the vertical. They are driven electrically in phase.

By placing two shutters in optical series (as described in the preceding paragraph) it is possible to greatly improve the dynamic range, but this expedient inherently increases the cost, weight, thickness, and complexity of the shutter. This expedient also increases the system's power requirements, and the use of three polarizers decreases the system's light transmission. In many applications, for example, for stereoscopic visors or aerospace applications, power, transmission, and weight characteristics are of critical importance.

Because of the defects inherent in conventional shutter systems, we undertook a research effort to develop a liquid crystal shutter which would have high dynamic range, good transmission, and high speed. Good transmission is important because image brightness is a desirable quality in a display system. In addition, the rise or decay time (transitions from open to closed or closed to open) of the shutter must take place within the vertical blanking interval of the video signal, which generally is about a millisecond. If the shutter's rise or decay is slower than the blanking interval, a portion of the image may be occluded.

In addition to stereoscopic video image selection applications, there are many other applications for a high dynamic range shutter of the inventive type. These applications include use of the high dynamic range shutters as replacements for mechanical shutters used in motion picture cameras and projectors, or as replacements for mechanical focal plane or between-the-lens shutters used in still photography. Moreover, the ability to vary shutter density continuously and incrementally with voltage makes a high dynamic range shutter system of the inventive type useful as a variably density filter in photographic or videographic camera applications. Such a variable neutral density filter could be used in place of, or in addition to, a lens' iris diaphragm for exposure control.

However, until the present invention, it was not known how to design or construct a high dynamic range, variable density liquid crystal shutter of the type having none of the above-described disadvantages of conventional shutter systems.

SUMMARY OF THE INVENTION

The invention is an achromatic shutter system that includes at least one surface mode liquid crystal, at least one polarizer, at least one analyzer. The analyzer includes at least one retarding plate and at least one polarizer. The axes of the inventive system's components have relative orientation selected so that the system's dynamic range is optimal.

Figure 3:
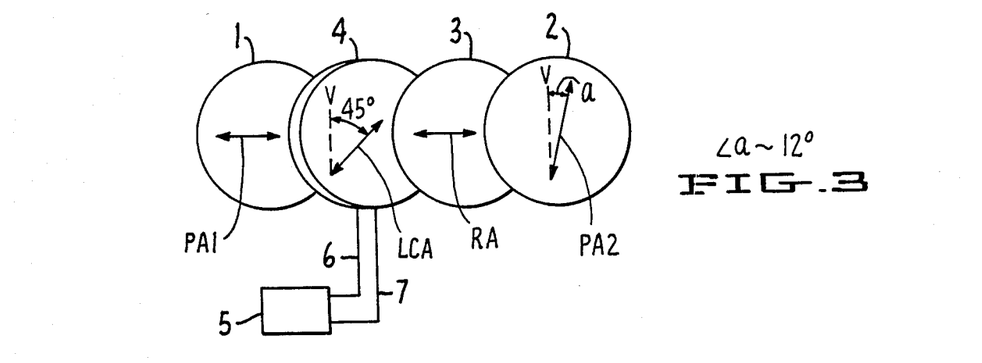
FIG. 3 is a schematic drawing of an embodiment of the inventive liquid crystal shutter that includes a single retarder.

In one preferred embodiment, the inventive achromatic shutter includes not only a first linear polarizer, a surface mode liquid crystal cell, and a second linear polarizer, as does a conventional surface mode liquid crystal shutter, but also a quarter wave retardation plate. When the axes of the system's components are optimally oriented, the inventive system has optimal dynamic range. In one variation of this preferred embodiment of the invention, the first polarizer's absorption axis PA1 is horizontal, the liquid crystal cell's rub axis LCA is oriented at 45 degrees clockwise with respect to the vertical, and the quarter-wave retarder's slow axis RA is parallel to the first polarizer axis PA1. In this variation, the second polarizer's axis PA2 is not, as would be expected for the particular surface mode shutters used in our experiments, orthogonal to the first polarizer's axis (which is the case in the conventional liquid crystal shutter shown in FIG. 1). Instead the axis PA2 is rotated from true orthogonality (as shown in FIG. 3) by an angle "a" substantially equal to 12 degrees for the particular surface mode shutters used in our experiments.

Various preferred embodiments of the inventive shutter are described herein with reference to FIGS. 3, 4, 5, 6 and 7. In all these embodiments, the inventive shutter is reversible, so that the shutter will function whether the unpolarized light enters from the left, or from the right.

The inventive shutter may be driven by an amplitude modulated AC carrier wave that has high voltage portions alternating with low voltage portions. Preferably, however, the shutter is driven by a carrier-less voltage signal that has time-averaged voltage substantially equal to zero (as is also the case with the modulated AC carrier wave).

Two of the inventive shutters may be mounted in an eyeglass frame and used as a wireless/active selection device for a field-sequential stereoscopic electronic display system. In response to broadcast synchronization pulses (which may be broadcast in the IR wavelength band) received from a stereoscopic image source, each shutter of the selection device may be driven at the field rate in synchronization with the stereoscopic image.

DESCRIPTION OF THE PREFERRED EMBODIMENTS

The inventive shutter design is a modification of conventional shutter designs (such as those shown in FIGS. 1 and 2) which results in a number of advantages, including a substantial improvement in dynamic range. Examples of preferred embodiments of the inventive shutter are described below with reference to FIGS. 3 through 7. A dynamic range of up to 200:1 or more may be achieved in accordance with the invention. All embodiments of the invention include properly oriented components, including at least one surface mode liquid crystal cell, at least one polarizer, and at least one analyzer (often including at least one quarter-wave retarding plate and at least one polarizer).

In order to understand how the axes of the components are oriented in the inventive system, it is helpful to appreciate the following optical phenomena underlying the invention.

In our research on liquid crystal shutter systems used with CRT displays, we came to recognize that for any such system, there is a point at which increasing the shutter dynamic range results in no further reduction in ghosting (as observed with a standard test subject). This is a limiting threshold in the display, and specifies the contribution of phosphor crosstalk to overall ghosting. The particular value of the shutter's dynamic range at this point gives what may be considered to be the "effective dynamic range" of the system. This value of the shutter's dynamic range we call the "phosphor point." For example, if there is no detectable improvement in ghosting with an improvement in shutter dynamic range beyond N:1, we then assign a phosphor point of N to the system.

It is possible readily to determine the phosphor point of a display by using a shutter whose dynamic range is continuously variable as a function of voltage (such as the inventive shutter shown in FIG. 3). By varying the voltage to such a variable shutter while observing a test image through the shutter, an observer can see when an increase in dynamic range ceases to reduce ghosting. Alternatively, the dynamic range may be determined photometrically as the voltage is varied, and the phosphor point identified as the measured dynamic range above which further increases in dynamic range do not further reduce ghosting.

The proper relative orientation of the inventive system's components is determined by sequentially rotating the axes of pairs of the components relative to each other while observing each rotation's effect on system dynamic range. An optimal relative axis orientation will typically be one which produces the maximum dynamic range, which may be measured photometrically. Typically, this value will be several times the phosphor point of a CRT using medium short phosphors. However, it is contemplated that for some applications, the optimal relative axis orientation may be chosen to be one which produces a selected ("optimal") dynamic range which is less than the maximum dynamic range.

We have measured the dynamic range of the inventive liquid crystal shutter with various driving signals, and have learned that the inventive system can be driven so that its only source of crosstalk is the phosphor afterimage, with the inventive shutter's dynamic range beyond the phosphor point.

The optimal design of the FIG. 3 and 4 inventive embodiments (to be described below) may conceptually be understood as one in which elements 2 and 3 function as an elliptical analyzer having elliptical polarization characteristics matching those of the subsystem composed of linear polarizer 1 and liquid crystal cell 4. We believe that one problem with conventional liquid crystal shutters (such as the FIG. 1 shutter) is that they employ a liquid crystal cell in series with a linear polarizer. This combination outputs a substantial amount of elliptically polarized light, rather than simple linearly polarized light. We have recognized that for improved operation, the conventional shutter thus requires an "elliptical" analyzer (i.e., an analyzer that will extinguish elliptically polarized light), as included in the FIG. 3 and 4 devices, rather than a conventional linear analyzer.

Figure 4:
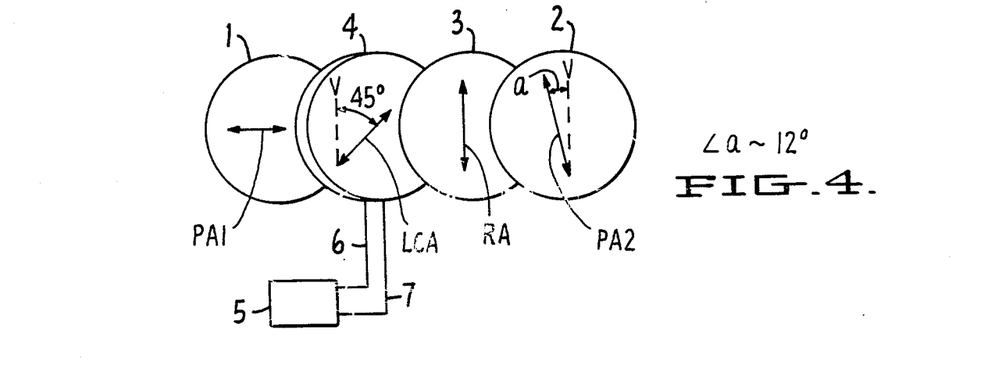
FIG. 4 is a schematic drawing of a alternative version of the inventive liquid crystal shutter that also includes a single retarder.
Figure 5:
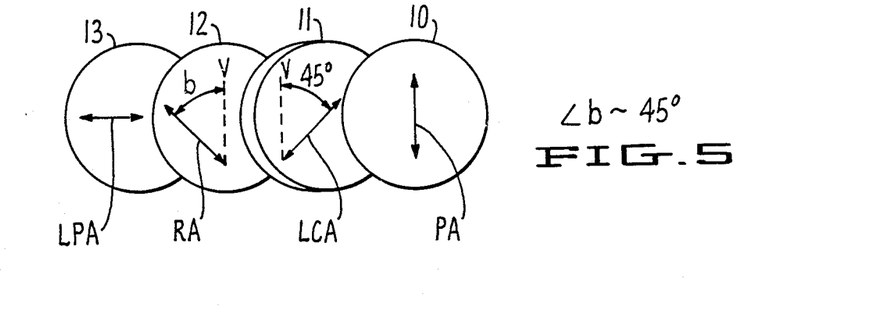
FIG. 5 is a schematic drawing of a version of the inventive liquid crystal shutter that includes both a circular polarizer and a linear polarizer.
Figure 6:
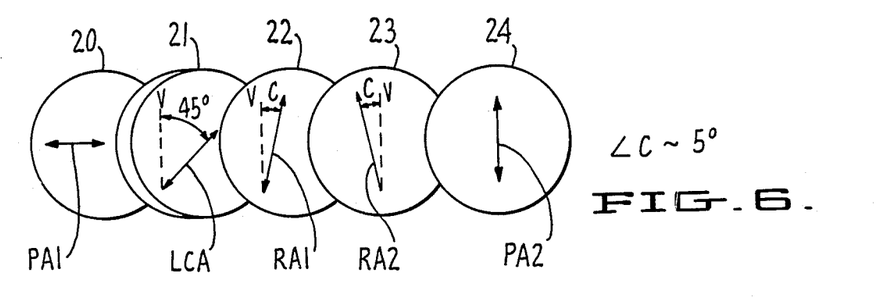
FIG. 6 is a schematic drawing of a version of the inventive liquid crystal shutter that includes two retarding plates ("retarders") having orthogonal slow axes.
Figure 7:
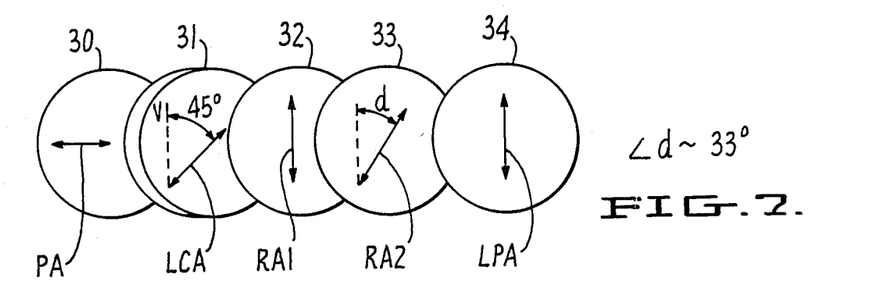
FIG. 7 is a schematic drawing of a version of the inventive liquid crystal shutter that includes two retarders, a circular polarizer, and a linear polarizer.

However, a more general explanation is needed in order to understand conceptually the experimentally determined inventive shutter designs shown in FIGS. 5, 6, and 7, as well as those shown in FIGS. 3 and 4. We believe the explanation is that the inventive shutters have optimal dynamic range because they are effectively "achromatized" by proper relative orientation of their components.

The theory of achromatic circular polarizers and retardation plates has been set forth in the literature, such as on page 10-127 of the "Handbook of Optics," sponsored by the Optical Society of America (McGraw-Hill, 1978) in the section entitled "Achromatic Circular Polarizers." Another relevant discussion may be found in two papers by S. Pancharatnam, published as Part I and Part II of "Achromatic Combinations of Birefringent Plates," The Proceedings of the Indian Academy of Sciences, Vl. XLI, No. 4, Sec. A (1955), pp. 130–144, and also in "Achromatic Retardation Plates," by Title and Rosennberg, SPIE, Vol. 307, Polarizers and Applications (1981), pp. 120–125.

We believe that use of properly oriented analyzers (with other properly oriented system components) effectively achromatizes the inventive shutter. For this reason, we denote the inventive device (in all its embodiments) as an "achromatic shutter."

The inventive system is simple and inexpensive to construct and manufacture. It is an improved version of the fast, but low dynamic range, surface mode liquid crystal shutter system described in U.S. Pat. No. 4,385,806 to Fergason. The improved version has a remarkably great dynamic range in comparison to other prior art systems. Compared to conventional shutter systems that achieve a similar dynamic range, the inventive device uses fewer parts, is less expensive to manufacture, is lighter in weight, thinner, smaller in size, has greater transmission, and uses less power.

In the FIG. 3 embodiment, the inventive device includes surface mode liquid crystal cell 4, first linear polarizer 1 whose absorption axis PA1 is horizontal and second linear polarizer 2 whose absorption axis PA2 is rotated clockwise from the vertical through angle a, which, for the particular surface mode shutters used in our experiments, is substantially equal to 12 degrees. (In all of FIGS. 1 through 7, the alignment axis of each liquid crystal cell is oriented at 45 degrees to the vertical.) In the FIG. 3 device, quarter-wave retarder 3 is placed between surface mode liquid crystal cell 4 and second polarizer 2, and has slow axis RA parallel to axis PA1. Polarizers 1 and 2 are linear sheet polarizers, such as model HN38 polarizers from Polaroid Corporation. The FIG. 3 shutter is optically reversible, so that unpolarized light may enter from either the right or the left side. All embodiments of the inventive shutter shown in FIGS. 3–7 are similarly reversible. Cell 4 is of the type described in above-referenced U.S. Pat. No. 4,385,806, which is incorporated herein by reference.

Driver 5 supplies a driving voltage signal to the conductive layers of cell 4 via cables 6 and 7. The preferred waveform and magnitude of the driving voltage signal will be described below, with reference to FIGS. 8-11.

In the variation on the FIG. 3 embodiment shown in FIG. 4, axis PA1 of first polarizer 1 is horizontal, alignment axis LCA of liquid crystal cell 4 is oriented as in the FIG. 3 embodiment, slow axis RA of quarter-wave retarder 3 is vertical, and absorption axis PA2 of second polarizer 2 is rotated counter-clockwise from the vertical through angle a. Angle a is again substantially equal to 12. As in the FIG. 3 embodiment, driver 5 supplies a driving voltage signal to cell 4 via cables 6 and 7. The FIG. 3 and FIG. 4 embodiments have similar optical characteristics.

We have conducted experiments on an optical bench, using retarders and polarizers mounted in optical rotators, in various combinations. As a result, we have identified a number of specific shutter designs that embody the invention.

One such design is shown in FIG. 5. The FIG. 5 shutter includes both linear polarizer 10 and right circular polarizer 13. The linear polarizer axis, LPA, of right circular polarizer 13 is horizontal, and the absorption axis PA of linear polarizer 10 is vertical. As does cell 4 of FIGS. 3 and 4, surface mode liquid crystal cell 11 has its axis LCA at 45 degrees to the vertical. Quarter-wave retarder 12 is interposed between right circular polarizer 13 and liquid crystal cell 11, and has slow axis RA which has been rotated counter-clockwise from the vertical by angle b, substantially equal to 45 degrees. The order of the parts of the FIG. 5 shutter is as follows: right circular polarizer 13, quarter-wave retarder 12, liquid crystal cell 11, and linear polarizer 10. When liquid crystal cell 11 is properly driven electrically, the resultant dynamic range is very great. Cell 11 is of the same type as cell 4 of FIGS. 3 and 4. Polarizers 10 and 13, and retarder 12 may be selected from commercially available models. An example of a suitable commercially available circular polarizer is the polarizer having product designation HN37 CP, available from Polaroid Corporation. Each of these Polaroid circular polarizers includes a sheet linear polarizer and a quarter-wave retarder bonded together with 45 degrees between their axes. Elements 12 and 13 may be collectively described as the "analyzer" of the FIG. 5 shutter.

FIG. 6 is an alternative embodiment of the inventive shutter which includes more than one retarder. The FIG. 6 shutter includes first linear polarizer 20, surface mode liquid crystal cell 21, first retarder 22, second retarder 23, and linear polarizer 24. In this embodiment, first and second polarizer axes PA1 and PA2 are oriented orthogonally.

Axis PA1 of polarizer 20 is horizontal and orthogonal to axis PA2 of second polarizer 24. Rub axis LCA of liquid crystal cell 21 is oriented at 45 as in the embodiments of FIGS. 3, 4 and 5. First and second retarders 22 and 23, with slow axes RA1 and RA2, respectively, have been rotated clockwise and counter-clockwise respectively from the vertical by small angle c, which angle is substantially equal to 5 degrees. Elements 22, 23, and 24 may be collectively described as the "analyzer" of the FIG. 6 shutter.

FIG. 7 is an alternative embodiment of the invention which includes two quarter-wave retarders, 32 and 33, and left circular polarizer 34. Axis PA of first polarizer 30 is oriented parallel to the horizontal, rub axis LCA of surface mode liquid crystal cell 31 is oriented at 45° as in the embodiments of FIGS. 3-6, slow axis RA1 of first retarder 32 is parallel with the vertical, slow axis RA2 of second retarder 33 is rotated clockwise from the vertical by angle d, which angle is substantially equal to 33 degrees. Left circular polarizer 34 includes a linear polarizer component having linear polarizer axis LPA oriented parallel with the vertical.

For the described inventive achromatic shutter embodiments, we have measured transmissions of 30% or more, for example, when using high efficiency polarizers such as those manufactured by Nitto Denko America, Inc., part number DU1220.

A person ordinarily skilled in the art, given the examples of the inventive shutter described herein and the foregoing explanation of the manner in which the axes of the shutter components should be oriented, will be able to readily produce numerous and varied combinations of shutter components which will have high transmission, and may be driven at high dynamic range. It is not the purpose of this specification to describe every one of a myriad of variations on the inventive shutter system, with various possible combinations of polarizers, surface mode liquid crystal cells, retarders, and relative axes orientation. It is, however, the purpose of this specification to enable a worker ordinarily skilled in the art to construct the specific embodiments described and to readily produce many suitable variations thereon, which will have high transmission and may be driven at the phosphor point. Various embodiments may be characterized by changes in the number of components included and their orientations or in the liquid crystal material used, by the use of retarders with retardation values other than quarter wave retardation value, or by the application of various voltages to the liquid crystal cell.

It is possible to vary the dynamic range of the inventive shutter either when rapidly switching between high and low voltage states, or in the steady state. In its steady state mode, the inventive shutter may be employed as a voltage controlled variable neutral density filter, for such purposes as exposure control in photography or videography, among other purposes. Changes in the density of the inventive device are continuously variable in response to continuous variations in applied high voltage level. Such density changes can be made very rapidly, i.e., usually in under a millisecond. Moreover, the transmission of the inventive shutter has been observed to be spectrally neutral over its operational range, and has more than a seven f stop dynamic range with a 30% transmission.

For the FIG. 3 embodiment, using a surface mode liquid crystal cell with liquid crystal compound manufactured by E. Merck (catalog designation ZLI-1565) with a spacing of 7 microns between the cell walls, and Nitto Denko America, Inc. (part number DU1220) polarizers, we have driven the cell with a 2 KHz carrier wave, modulated by a square wave of lower peak to peak voltage of approximately 6.5 volts and higher peak to peak voltage of approximately 40 volts, to obtain a dynamic range of about 200:1 (measured steady state). We have also measured the speed of this shutter and determined a rise time of less than half a millisecond and a decay time of approximately two milliseconds.

It is conventional to employ a 2 KHz (or other high frequency) carrier for the driving signal for conventional surface mode liquid crystal cells. The purpose for using a carrier wave of this frequency is to avoid electro-chemical reactions within the cells. The inner walls of the glass chambers of the cells immediately adjacent to the liquid crystal fluid are coated with a conductor. It has conventionally been believed that if the carrier wave is removed leaving a bare square-wave signal to drive the cell, ion migration from one conductor wall to the other will take place, thereby rendering the cell inoperative.

Experiments we have performed demonstrate that the cell performance is indeed greatly diminished if the cell is driven without using an AC carrier wave, but instead using a square wave which is either above or below ground. However, we have unexpectedly discovered that a carrier-less signal which is equally above and below ground, (i.e., has a substantially zero time-averaged net voltage) such as the signals shown in FIGS. 8, 9 and 10, will produce no reduction in the cell's performance relative to the cell's performance when an amplitude-modulated 2 KHz carrier is employed.

Figure 8:
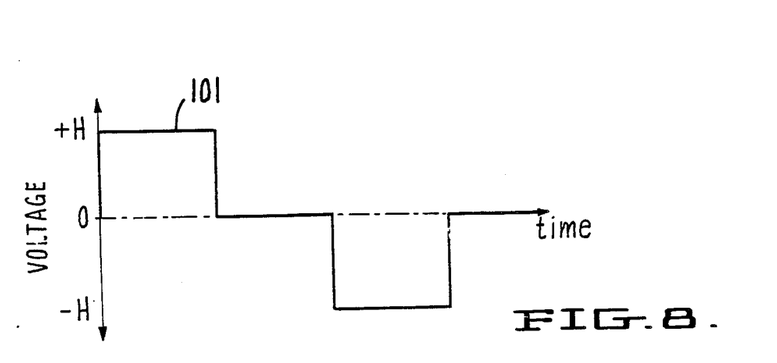
FIG. 8 is a graph of the waveform of a preferred carrier-less signal for driving the inventive achromatic shutter.
Figure 9:
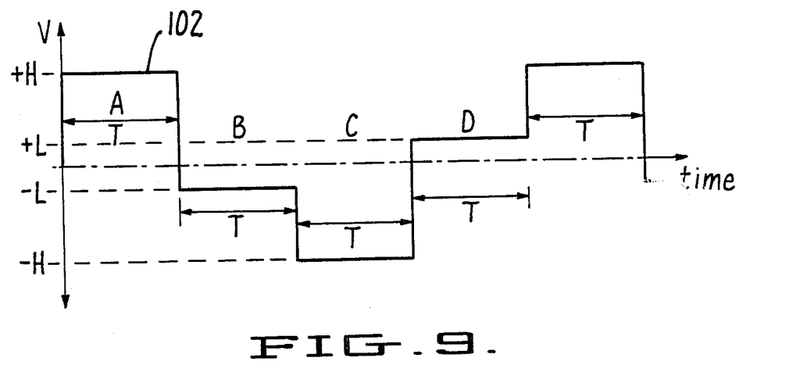
FIG. 9 is a graph of the waveform of another preferred carrier-less signal for driving the inventive achromatic shutter.
Figure 10:
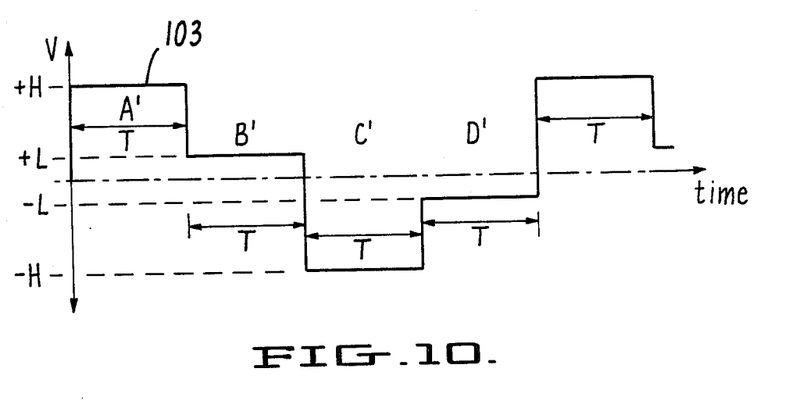
FIG. 10 is a graph of the waveform of another preferred carrier-less signal for driving the achromatic shutters of the invention.
Figure 11:
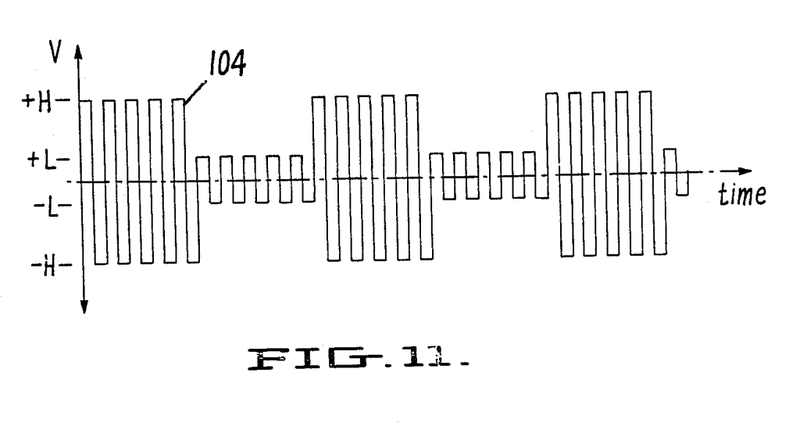
FIG. 11 is a graph of the waveform of a modulated carrier wave signal for driving the inventive shutter.

FIGS. 8, 9 and 10 show three carrier-less driving signal waveform which have been found to be useful for driving the inventive shutter. Each carrier-less wave in FIGS. 8–10 has zero time-averaged net voltage, and has alternating high potential portions (with voltage equal to $+H$ or $-H$), and low potential portions (with voltage equal to $+L$ or $-L$, where $0 \leq +L < +H$). In waveform 101 of FIG. 8, the high potential portions, above and below ground respectively, have equal absolute magnitude and the low voltage portions are at zero voltage. In waveform 102 of FIG. 9, high voltage portions A and C have equal absolute magnitude, but are above and below ground respectively, and low voltage portions B and D have equal absolute magnitude, with portion B being below ground and portion D being above ground. In waveform 103 of FIG. 10, high potential portions A' and C' have equal absolute magnitude, but are above and below ground respectively, and low potential portions B' and D' have equal absolute magnitude, B' being above ground and D' being below ground Waveform 104 of FIG. 11 is an alternative driving signal waveform that may be used to drive each cell of the inventive shutter. Waveform 104 is a square wave modulated AC carrier wave, with alternating high voltage and low voltage portions.

It will be apparent to one of ordinary skill in the art of electrical driving circuit design how to construct a circuit capable of producing a driving signal having any of the waveforms 101 through 104 (or numerous variations thereof), or capable of producing two such driving signals (of any of the types 101 through 104, or variations thereon) that are 180° out of phase with respect to the other, for driving one of the inventive shutters, or for driving two of the inventive achromatic shutters out of phase with respect to each other.

We prefer to employ carrier-less driving signals having any of waveforms 101 through 103 (or variations thereof) rather than a modulated AC carrier driving signal having waveform such as 104.

An important advantage to using such a carrier-less driving signal is that a simpler, more compact, and less costly driver circuit may be employed and far less power is required to operate the cell. The reduction in power needed to drive the cell is truly substantial, better than an order of magnitude. This reduced power requirement has an important application in the wireless/active selection device embodiment to be described below with reference to FIG. 12.

We have observed that, for a surface mode cell of the zero twist type with a 7 micron spacing between cell walls, and a liquid crystal material of 0.13 birefrigence, the waveform 101 shown in FIG. 8 will produce good dynamic range when the voltages $+H$ and $-H$ are 24 volts above and below ground respectively, and the low voltages ($+L$ and $-L$) are 0 volts.

For a similar cell but with 180 twist, we find that the waveform shown in FIG. 10, with voltages $+H$ and $-H$ equal to 24 volts above and below ground respectively, and voltages $+L$ and $-L$ equal to 2 volts above and below ground respectively, will give maximum dynamic range.

The voltages must be set carefully in order to avoid unwanted flicker. Moreover, these above recommendations are only cited as examples, and a worker ordinarily skilled in the art will be able readily to find other suitable combinations of cell spacing and liquid crystal material, with a selection of wave forms shown in 8, 9, and 10, and with various values for voltages $+H$, $-H$, $+L$ and $-L$.

Figure 12:
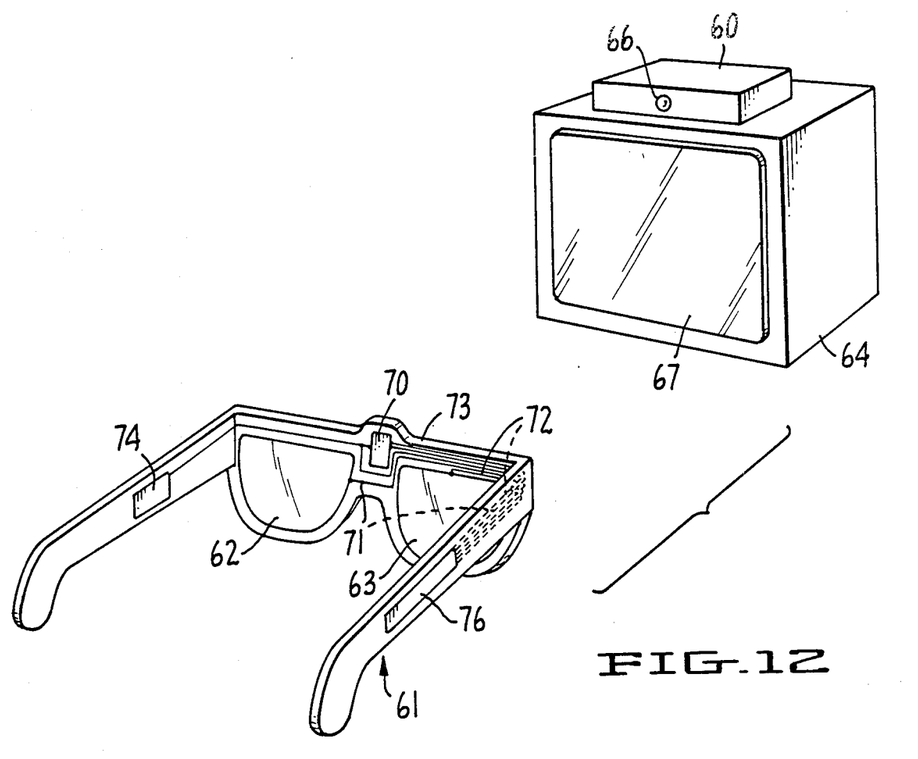
FIG. 12 is a schematic drawing of a wireless/active selection device embodying the achromatic shutter.

Another application of the inventive achromatic shutter is in a wireless/active selection device of the type shown in FIG. 12. We will first explain benefits of such a device, and will later describe the construction of the device.

Large liquid crystal panels, used for switching the characteristic of polarized light at field rate, have been suggested and manufactured as a product by StereoGraphics Corporation and Tektronix, Inc. These devices are extremely expensive to manufacture. Accordingly, any product including such a device must have a high price, which limits the product's applicability. It has become clear to us that the largest single cost factor in a stereoscopic electronic display is the cost of the large liquid crystal panels. Mounting a large liquid crystal device in juxtaposition to the display screen of a CRT (or other display device) is desirable because it allows an observer to use passive glasses including sheet polarizers, which have ergonomic superiority compared to active visors or glasses which are tethered to and powered by a controller.

The inventive achromatic shutter, driven with a carrier-less signal (as described above) may be used in a stereoscopic display system to achieve a substantial reduction in the system's price with no impairment of performance. This is the case primarily because the liquid crystal cell in the achromatic shutter, if used at the eyes, could be very small and inexpensive.

The FIG. 12 system employs a controller 60 that includes infrared (IR) transmitter 66. The transmitter broadcasts synchronization information to pair 61 of spectacles having inventive achromatic shutter components 62 and 63 as lenses. It is possible to synchronize the occlusion of these spectacles' active electro-optical elements with the field-rate of the image displayed by electronic display unit 64, where the transmitter 60 and display unit 64 receive the same synchronization information from a common source (not shown). An infrared transmitter is a preferred transmitter to use for this purpose, but another wireless means, such as radio or ultrasound, may alternatively be employed. Use of an infrared transmitter is desirable because of the proliferation of infrared technology in the field of home electronics which has resulted in its relative perfection as a form of wireless signalling.

The selection device for the FIG. 12 stereoscopic electronic display system is pair 61 of eyeglasses including achromatic shutter components 62 and 63. The achromatic shutter components are preferably driven by a carrier-less voltage signal whose net time-averaged voltage is substantially zero (such as the signals described above with reference to FIG. 8, FIG. 9 and FIG. 10). Each of identical achromatic shutter elements 62 and 63 is preferably a portion of the shutter shown in FIG. 5 or FIG. 7. For the sake of simplicity, and because the argument is obviously extendable with clearcut analogy, we will describe FIG. 12 as if each of shutter elements 62 and 63 is a portion of the FIG. 5 shutter. The right circular polarizer of the FIG. 5 shutter (element 13 of FIG. 5) is mounted on screen 67 of CRT display 64 so that screen 67 emits circularly polarized light. All of the other shutter elements (elements 10, 11 and 12) are mounted as the lenses of spectacles 61 (the device worn at the eyes), so that each of elements 62 and 63 includes polarizer 11, liquid crystal cell 12, and retarder 13. The combination of spectacles 61 and circular polarizing screen 67 functions as a distributed shutter. In other words, when looking through element unit 62 (or 63), only when looking through circular polarizer 67 mounted on CRT unit 64 would there be a shuttering effect. The advantage of such a distributed arrangement is that when the viewer looks out at the ambient environment around unit 64, there is no duty cycle imposed on the eye of the beholder. This results in an immediate improvement (of approximately a factor of two) in transmission of the ambient light. Also, circular polarizer 67 (corresponding to element 13 of FIG. 5), which is not mounted at the eye, does not absorb any light which would be coming to the eye from the ambient environment. One advantage of the distribution of the shutter elements in the FIG. 12 system is that a lighter weight (partial) shutter at the eye can be constructed. Even more important, when viewing other CRT displays with the spectacles 61 of FIG. 12, for example non-stereoscopic displays, there will be no occlusion of such other displays, and no "roll bar," which would otherwise result from the lack of synchronization between field-rate and shutter cycle.

Alternatively, it is possible to employ the shutters shown in FIG. 3, 4 or 6 to avoid the use of a large circular polarizer, which must be placed at the CRT.

The FIG. 12 system includes an IR link, including IR transmitter 66 at display unit 64, and IR receiver 70 in the frame of spectacles 61. Receiver 70 receives IR sync information broadcast by transmitter 66 and uses this sync information to synchronize the drive signals supplied via electric lines 71 and 72 to achromatic shutter elements 62 and 63 so that elements 62 and 63 switch in synchronization with the video display field-rate. With appropriate carrier-less driving signals (described above) driving the shutter elements 2 and 63, there is a vast reduction in power required for driving the shutter elements. Thus, in the FIG. 12 system, power supply and drive circuit for shutter elements 62 and 63 and IR receiver 70 may be incorporated in small battery pack 74 and module 76 incorporated within the frames of spectacles 61 themselves, or in a small pack (not shown) the size of a credit card mounted adjacent the spectacles, such as in a shirt pocket of the viewer. Such a reduction of power is of critical importance, since it is important to be able to use small, light-weight batteries and to be able to run the spectacles for a long period of time without replacement of batteries or recharging of batteries.

The drive signals supplied to shutters 62 and 63 are generated in drive circuit module 76 incorporated in the frame of spectacles 61, and connected via wires 71 and 72 to shutter elements 62 and 63, respectively, and via wire 73 to receiver 70.

Figure 13:
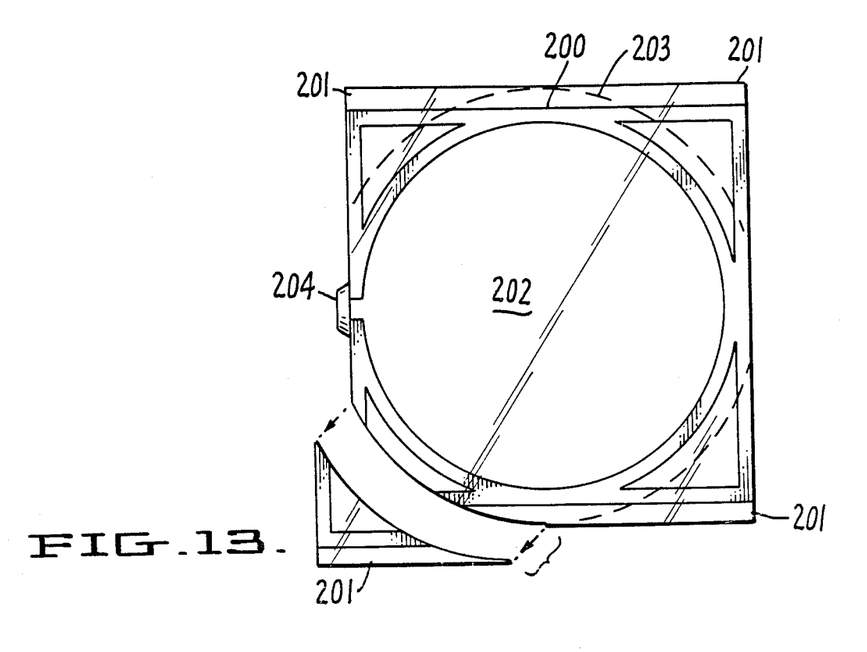
FIG. 13 is a top plan view of a circular liquid crystal cell surrounded by a square gasket, which may be cut in accord with the inventive method.

Achromatic shutters of any desired shape may be constructed using the following technique. As described above, liquid crystal cells of the type used in the inventive shutter include two substantially parallel sheets of glass which enclose a thin layer of liquid crystal material. Around the periphery of this sandwich is gasket material which contains the liquid crystal. We have recognized that if the gasket material outlines the desired part, a saw may be used to cut the part to the desired shape. Thus, a common cutting stroke will align the outer edges of the gasket and glass sheets. By cutting just outside of the gasket, the gasket maintains its integrity, and, if it is handled properly, will not break, so that the liquid crystal material will not leak. Accordingly, liquid crystal cells of any shape may be manufactured using this scheme. In FIG. 13, we show a top plan view of a circular liquid crystal cell, surrounded by a square gasket, which may be cut, for example, with a core cutter or water cutter. Gasket 200 lies between parallel transparent glass plates 201 (one directly below the other in when viewed from above the plane of FIG. 13). Liquid crystal material 202 is sealed by plug 204 in the volume bounded by plates 201 and gasket 200, so that the inner flat surfaces of plate 201 and the inner edge of gasket 200 are in contact with the liquid material. By sawing along circular path 203, a generally circular liquid crystal cell is produced. The technique described with reference to FIG. 13 may be employed to manufacture liquid crystal cell components of various shapes, such as the semi-circular shape of elements 62 and 63 shown in FIG. 12.

The above description is merely illustrative of the invention. Various changes in the details of the materials, designs and methods described may be within the scope of the appended claims.

We claim:

1. An achromatic liquid crystal shutter system, including:
   (a) a first polarizer, having an absorption axis oriented in a first direction;
   (b) a first surface mode liquid crystal cell, having a rub axis oriented in a second direction; and
   (c) a first analyzer, having a slow axis oriented in a third direction; wherein the first, second, and third directions are selected so that the system is capable of being driven so as to have optimal dynamic range.

2. The system of claim 1, wherein the first analyzer includes a first retardation plate whose slow axis is oriented in said third direction and a second linear polarizer having an absorption axis oriented in a fourth direction, wherein the liquid crystal cell is positioned between the first polarizer and the first retardation plate, and the first retardation plate is positioned between the liquid crystal cell and the second linear polarizer.

3. The system of claim 2, wherein the first direction is separated from the second direction by an angle substantially equal to 45 degrees, the first direction is separated from the fourth direction by an angle substantially equal to 78 degrees, and the first direction is substantially parallel to the third direction.

4. The system of claim 1, wherein the first analyzer includes a first retardation plate whose slow axis is oriented in said third direction and a second linear polarizer having an absorption axis oriented in a fourth direction, wherein the liquid crystal cell is positioned between the first polarizer and the first retardation plate, the first retardation plate is positioned between the liquid crystal cell and the second linear polarizer, the second direction is separated from the first direction by an angle substantially equal to 45 degrees, the first direction is separated from the fourth direction by an angle substantially equal to 12 degrees, and the first direction is substantially orthogonal to the third direction.

5. The system of claim 1, wherein the first polarizer is a right circular polarizer including a linear polarizing element whose absorption axis is oriented in the first direction, the first analyzer includes a first retardation plate whose slow axis is oriented in said third direction and a second linear polarizer having absorption axis oriented in a fourth direction, wherein the first retardation plate is positioned between the first polarizer and the liquid crystal cell, and the liquid crystal cell is positioned between the first retardation plate and the second polarizer.

6. The system of claim 5, wherein the fourth direction is separated from the first direction by an angle substantially equal to 90 degrees, the second direction is separated from the third direction by an angle substantially equal to 45 degrees, and the first direction is substantially orthogonal to the fourth direction.

7. The system of claim 1, also including:
a second retardation plate having a slow axis oriented in a fifth direction; and wherein:
the first polarizer is a linear polarizer;
the first and second retardation plates are positioned between the second polarizer and the liquid crystal cell;
the liquid crystal cell is positioned between the first polarizer and the second retardation plate; and
the first direction is substantially orthogonal to the second direction.

8. The system of claim 7, wherein the second direction is separated by an angle substantially equal to 45 degrees from the first direction; the fourth direction is separated by an angle substantially equal to 355 degrees from the second direction; and
the fifth direction is separated by an angle substantially equal to 5 degrees from the second direction.

9. The system of claim 1, also including:
a second retardation plate having a slow axis oriented in a fifth direction; and wherein:
the first polarizer is a linear polarizer;
the first and second retardation plates are positioned between the second polarizer and the liquid crystal cell;
the liquid crystal cell is positioned between the first polarizer and the second retardation plate;
the first direction is substantially orthogonal to the second direction;
the second direction is separated by an angle substantially equal to 45 degrees from the first direction;
the fourth direction is separated by an angle substantially equal to 33 degrees from the second direction; and
the fifth direction is substantially parallel to the second direction.

10. The system of claim 1, including:
(d) a driver electrically coupled to the first liquid crystal cell and capable of supplying a driving voltage signal to the cell that will drive the system so as to have the optimal dynamic range.

11. The system of claim 10, wherein the driving voltage signal is a carrier-less wave, whose time-averaged voltage is substantially equal to zero.

12. The system of claim 1, wherein the first, second, and third directions are selected so that the system is capable of being driven so as to have maximum dynamic range.

13. The system of claim 1, wherein the first cell comprises two substantially parallel glass plates each having two parallel flat faces and an outer edge, a gasket attached between the facing flat faces of the glass plates and having an outer edge, and liquid crystal material contained between the glass plates and the gasket, wherein the outer edge of the gasket aligns with the outer edges of the plates as a result of having been cut by a common cutting stroke.

14. An achromatic liquid crystal shutter system, including:
(a) a first linear polarizer having a first absorption axis;
(b) a surface mode liquid crystal cell with a rub axis oriented at a first angle with respect to the first absorption axis; and
(c) an elliptical polarizer unit having a slow axis oriented at a second angle with respect to the rub axis, where the first and second angles are selected so that the system is capable of being driven so as to have optimal dynamic range.

15. The system of claim 14, also including:
(d) a driver electrically coupled to the liquid crystal cell and capable of supplying a driving voltage signal to the cell that will drive the system so as to have the optimal dynamic range.

16. The system of claim 15, wherein the driving voltage signal consists of alternating AC signal portions, having high peak-to-peak voltage and low peak-to-peak voltage, respectively.

17. The system of claim 15, wherein the driving signal is a carrier-less signal whose time-averaged magnitude is substantially equal to zero.

18. The system of claim 14, wherein the first angle is substantially equal to 45 degrees, and the elliptical polarizer unit includes:
(d) a quarter-wave retarding plate having a slow axis oriented substantially parallel to the first absorption axis; and
(e) a second linear polarizer having a second absorption axis separated by an angle substantially equal to 78 degrees from the first absorption axis.

19. The system of claim 14, wherein the first angle is substantially equal to 45 degrees, and the elliptical polarizer unit includes:
(f) a quarter-wave retarding plate having slow axis oriented substantially orthogonal to the first absorption axis; and
(g) a second linear polarizer having a second absorption axis separated by an angle substantially equal to 348 degrees from the slow axis.

20. An achromatic liquid crystal shutter system, including:
(a) a first linear polarizer having a first absorption axis;
(b) a second polarizer having a second absorption axis;
(c) a surface mode liquid crystal cell having a first rub axis;

(d) a first retardation plate having a first slow axis; wherein:

the first and second absorption axes, the first rub axis, and the first slow axis have relative orientation selected so that the system is capable of being driven so as to have optimal dynamic range.

21. The system of claim 20, also including:

(e) a driver electrically coupled to the liquid crystal cell, and capable of supplying a driving voltage signal to liquid crystal cell that will drive the system so as to have the optimal dynamic range.

22. The system of claim 20, wherein the second polarizer is a right circular polarizer including a linear polarizing element whose absorption axis is said second absorption axis, the retardation plate is positioned between the second polarizer and the liquid crystal cell, and the liquid crystal cell is positioned between the retardation plate and the first polarizer.

23. The system of claim 20, also including:

(e) a second retardation plate having a second slow axis; and wherein:

the second polarizer is a linear polarizer;

the first and second retardation plates are positioned between the first the liquid crystal cell; and the liquid crystal cell is positioned between the second polarizer and the second retardation plate.

24. An achromatic shutter system capable of selecting alternating ones of the fields of a field-sequential image, including (a) a polarizer having an absorption axis;

(b) a surface mode liquid crystal cell having a rub axis;

(c) an analyzer having a slow axis, wherein the absorption axis, the rub axis, and the slow axis have relative orientation selected so that the system may be driven so as to have optimum dynamic range;

(d) a receiver capable of receiving remotely generated synchronization pluses characterizing the image; and (e) a driving circuit electrically coupled to the receiver and the cell, and capable of producing a driving voltage signal for the cell, said driving voltage signal having low voltage portions at the field rate in synchronization pulses with the image.

25. The system of claim 24, wherein the amplitude of each voltage portion is selected so as to drive the subsystem comprising elements (a), (b), and (c) so as to have maximum dynamic range.

26. The system of claim 24, wherein the driving voltage signal is a carrier-less signal whose time-averaged magnitude is substantially equal to zero.

27. The system of claim 24, wherein the receiver is capable of receiving an infrared signal modulated by the synchronization pulses, and wherein elements (b), (d) and (e) are mounted in an eyeglass frame dimensioned to be worn by an observer of the image.

28. The system of claim 24, wherein the cell comprises two substantially parallel glass plates each having two parallel flat faces and an outer edge, a gasket attached between the facing flat faces of the glass plates and having an outer edge, and liquid crystal material contained between the glass plates and the gasket, wherein the outer edge of the gasket aligns with the outer edges of the plates as a result of having been cut by a common cutting stroke.

29. The system of claim 24, wherein the polarizer is positioned remotely from the surface mode liquid crystal cell and the analyzer, and also including:

an emitter for generating the synchronization pulses and transmitting the synchronization pulses to the receiver, wherein the emitter is positioned remotely from the receiver.

30. The system of claim 24, also including:

a monitor for displaying the field-sequential image, wherein the emitter and the polarizer are mounted on the monitor.

31. An achromatic liquid crystal shutter system, including:

(a) a polarizer, having an absorption axis oriented in a first direction;

(b) a liquid crystal cell, having an alignment layer with an alignment axis oriented in a second direction;

(c) an analyzer, having a slow axis oriented in a third direction;

wherein the first, second, and third directions are selected so that the system is capable of being driven so as to have optimal dynamic range.

32. The system of claim 31, also including:

(d) a driver electrically coupled to the liquid crystal cell and capable of supplying a carrier-less driving voltage signal to the cell that will drive the system so as to have the optimal dynamic range.

33. An achromatic shutter system capable of selecting alternating ones of the fields of a field sequential image, including:

(a) a polarizer having an absorption axis;

(b) a liquid crystal cell having an alignment layer with an alignment axis oriented in a second direction;

(c) an analyzer having a slow axis, wherein the absorption axis, the alignment axis, and the slow axis have relative orientation selected so that the system may be driven so as to have optimum dynamic range;

(d) a receiver capable of receiving remotely generated synchronization pulses characterizing the image; and (e) a driving circuit electrically coupled to the receiver and the cell and capable of producing a driving voltage signal for the cell, said driving voltage signal having low voltage portions at the field rate in synchronization pulses with the image.

* * * * *